United States Patent [19]

Cecchin et al.

[11] Patent Number: 4,734,459

[45] Date of Patent: Mar. 29, 1988

[54] IMPACT-RESISTANT POLYPROPYLENE COMPOSITIONS HAVING IMPROVED WHITENING RESISTANCE

[75] Inventors: Giuliano Cecchin; Floriano Guglielmi, both of Ferrara, Italy

[73] Assignee: HIMONT Incorporated, Wilmington, Del.

[21] Appl. No.: 907,745

[22] Filed: Sep. 15, 1986

Related U.S. Application Data

[63] Continuation-in-part of Ser. No. 758,411, Jul. 24, 1985, abandoned.

[30] Foreign Application Priority Data

Jul. 30, 1984 [IT] Italy ............................... 22120 A/84

[51] Int. Cl.$^4$ .............. C08F 297/08; C08L 23/12; C08L 23/08; C08L 23/20
[52] U.S. Cl. .................. 525/247; 525/240; 525/243; 525/245; 525/323
[58] Field of Search .............. 525/240, 323, 243, 247

[56] References Cited

U.S. PATENT DOCUMENTS

| | | | |
|---|---|---|---|
| 3,254,139 | 5/1966 | Anderson et al. | 525/240 |
| 3,426,105 | 2/1969 | Christensen | 525/240 |
| 3,634,552 | 1/1972 | Foglia et al. | 525/240 |
| 3,849,520 | 11/1974 | Bullard et al. | 525/240 |
| 4,312,964 | 1/1982 | Sekine et al. | 525/240 |
| 4,316,966 | 2/1982 | Mineshima et al. | 525/240 |
| 4,434,264 | 2/1984 | Ficker | 524/396 |
| 4,521,566 | 6/1985 | Galli et al. | 525/323 |
| 4,547,552 | 10/1985 | Toyota et al. | 525/247 |

FOREIGN PATENT DOCUMENTS

| | | | |
|---|---|---|---|
| 010434 | 4/1980 | European Pat. Off. | 525/323 |
| 52557 | 5/1982 | European Pat. Off. | 525/240 |
| 54-103478 | 8/1979 | Japan . | |
| 58-071910 | 4/1983 | Japan | 525/323 |

OTHER PUBLICATIONS

Abstract–Japanese Pat. No. 52072-744-6/77.

*Primary Examiner*—Carman J. Seccuro

[57] ABSTRACT

Disclosed are polypropylene compositions having high impact resistance at low temperatures, and improved whitening resistance. They comprise:

(a) 60–90 parts by weight of polypropylene with an isotacticity index >90; and
(b) 10–40 parts by weight of an ethylene/butene-1 polymeric mixture containing 50–95% by weight of polymerized ethylene, and consisting essentially of:
  20–95% by weight of a crystalline fraction (I) with crystallinity of the polyethylene type, that is insoluble in xylene at 23° C.; and
  5–80% by weight of an ethylene/butene-1 amorphous copolymeric fraction (II), that is soluble in xylene at 23° C., and contains 40–70% by weight of ethylene;
and in which the weight ratio between total polymerized ethylene and the amorphous fraction (II) is 0.6–8.

Such compositions are obtained by polymerization processes comprising the step of homopolymerizing propylene to stereoregular polymer, and a subsequent step of copolymerizing ethylene/butene-1 mixtures, said steps being effected by Ziegler-Natta stereospecific catalysts, which include a titanium compound carried on a magnesium halide in the active form.

5 Claims, No Drawings

IMPACT-RESISTANT POLYPROPYLENE COMPOSITIONS HAVING IMPROVED WHITENING RESISTANCE

BACKGROUND OF THE INVENTION

As is known, isotactic polypropylene, though being endowed with an exceptional combination of excellent properties, is affected by the drawback of insufficient impact resistance at relatively low temperatures.

According to the teachings of the prior art, it is possible to obviate this drawback, without sensibly affecting the other polymer properties, by modifying the synthesis process or by blending with rubbers.

The modification of the synthesis process comprises, after homopolymerizing propylene to isotactic polymer, copolymerizing in the presence of the isotactic polymer ethylene and propylene mixtures. Processes and compositions representative of the prior art are described in U.S. Pat. Nos. 3,629,368, 3,670,368, 3,670,053 and 3,200,173, and European patent application No. 0077532.

The impact resistance at low temperatures of isotactic polypropylene can be improved by blending with it an ethylene-propylene rubber (see, for example, U.S. Pat. No. 3,627,852).

The products of the modified synthesis process and of blending are characterized by an excellent balance of properties, in particular high rigidity and resistance to impact even at relatively low temperatures. Such products, however, though being particularly suitable for the manufacture of injection molded articles, result in a particularly serious drawback as regards the aesthetic characteristics of articles manufactured therefrom. These products, in fact, are characterized by a low resistance to whitening when subjected to impact. Such phenomenon appears in the form of a whitish spot that forms around the impact-concerned area.

To obviate such drawback, it has been suggested to mix specific propylene-ethylene copolymers, prepared in two steps, with specific types of polyethylene (see for example, U.S. Pat. No. 4,312,964). However, this involves, in addition to the two synthesis process steps, the further step of mixing the copolymers with the polyethylene. This represents a considerable drawback as regards both the economics and the simplicity of producing the end product.

THE PRESENT INVENTION

It has now surprisingly been found that it is possible to obtain in two steps polypropylene compositions with high rigidity, high impact resistance, and high whitening resistance. In the first step propylene is homopolymerized to stereoregular polymer, and in the second step ethylene-butene-1 mixtures are copolymerized with the stereoregular polymer.

On the basis of the prior art it could not be expected that the substitution of the propylene-ethylene rubber by ethylene-butene-1 rubber would result in polypropylene compositions with improved whitening resistance.

In summary the present invention comprises polypropylene compositions with high impact resistance at low temperatures, and improved whitening resistance, which contain as essential components:

60–90 parts by weight of polypropylene with an isotacticity index > 90, preferably > 95; and 10–40 parts by weight of an ethylene-butene-1 copolymeric mixture containing 50–95% by weight of a crystalline fraction (I) with polyethylene-type crystallinity, and that is insoluble in xylene at 23° C., and 5–80% by weight of an amorphous copolymeric fraction (II), that is soluble in xylene at 23° C. and that contains 40–70% by weight of polymerized ethylene, in which mixture the weight ratio of total polymerized ethylene to fraction II ranges from 0.6 to 8.

The compositions are obtained by means of polymerization processes comprising at least a step of homopolymerizing propylene to stereoregular polymer and a subsequent step of copolymerizing in the presence of said polymer ethylene-butene-1 mixtures, the steps being effected with Ziegler-Natta stereospecific catalysts prepared in particular from a titanium compound carried on a magnesium halide in the active form having a surface area greater than 3 m$^2$/g and/or in the X-ray spectrum of which the line of higher intensity appearing in the spectrum of non-activated magnesium halide is broadened or replaced by a halo.

The polymerization processes are conducted continuously or discontinuously according to conventional techniques by operating in the liquid phase either with or without an inert diluent, or in the gas phase or according to mixed liquid-gas techniques.

Particularly advantageous has proved the use of such catalysts with a spheric morphology and a narrow particle size distribution in mixed polymerization processes, in which the homopolymerization of propylene is accomplished in liquid monomer and the copolymerization of ethylene-butene-1 in the presence of the homopolymer is accomplished in the gas phase.

Between the two steps, the reactor is degassed in order to get a substantially complete removal of residual propylene. "Substantially complete removal" means removal to residual concentrations of propylene in the gas phase below 5% by mol with respect to the other monomers.

The physical-mechanical properties of the compositions of this invention essentially depend on the amount and quality of the copolymeric mixture. The total polymerized ethylene content ranges from 5 to 38% by weight of the mixture and the total polymerized butene-1 content ranges from 0.5 to 20% by weight of the mixture.

The molecular weight of the various components, determined by measuring the inherent viscosity in tetrahydronaphthalene at 135° C. varies, as a function of the components' nature, within the following limits:

1–4.5 dl/g for polypropylene;
2–15 dl/g for fraction I, and
1.5–10 dl/g for fraction II.

The compositions herein described, based on an ethylene-butene-1 copolymeric phase, exhibit a surprising improvement in whitening resistance as compared with the compositions based on ethylene-propylene copolymers and having the same mechanical properties.

Amount and composition of the ethylene - butene-1 copolymer mixture are not critical as regards whitening resistance, the latter depending on the melt flow rate of the product, especially below 1 g/10′.

In any case the stress-whitening resistance values are consistently better than those of corresponding compositions based on ethylene-propylene copolymers, the other physicalmechanical properties being equal.

The following examples are given to illustrate the invention, without being however a limitation thereof.

EXAMPLES 1-4

General Procedures

The polymerizations were carried out in a stainless steel 22-1 autoclave equipped with a helical magnetic stirrer operated at about 90 rpm. Temperature and pressure were kept constant. The gas phase was continuously analyzed by means of a process gas chromatograph.

The polymerizations were carried out discontinuously in two steps: in the first step, propylene was homopolymerized in liquid monomer, while in the second step ethylene and butene-1 (or propylene, in the comparative tests) were copolymerized in the gas phase.

(A) 1st step:

Into the autoclave at 20° C. there were introduced 16 1 of liquid propylene, hydrogen and catalyst complex consisting essentially of a solid component (prepared according to example 20 of European patent application No. 0045977), and a mixture of 75 ml of Al triethyl (TEAL) at 10% in hexane and 1 g of diphenyldimethoxysilane (DPMS). The TEAL concentration is not critical and can be varied in the range from 0.1 to 5 g/l $C_3$. The molar ratio between TEAL and DPMS can range from 0.5 to 100, preferably from 2 to 40. Optionally, the catalyst can be treated, before being introduced into the reactor, with a small amount of propylene. The ratio between the thus prepolymerized propylene and solid catalyst component generally ranges from 0.5 to 1000, preferably from 1 to 100.

Such complex was fed by means of propylene pressure. The temperature was brought to 70° C. in about 10 minutes and was kept constant all through the polymerization. Hydrogen was continuously analyzed in the gas phase and was fed in such way as to keep constant the desired concentration thereof.

After the time indicated in Table I, substantially all the residual monomer was removed by degassing at 60° C. and at atmospheric pressure.

(B) 2nd step:

The homopolymer (a powder) in the autoclave, after removal of a sample for the isotacticity index (I.I.) determination, was brought to 60° C. Subsequently there were fed butene-1 (propylene in the comparative tests) and then ethylene in the amounts and ratios necessary to obtain the desired composition of the gas phase and the pressure indicated in Table I (such amounts will be referred to as fed butene and fed ethylene, respectively).

During the polymerization the pressure was kept constant by feeding from a thermoregulated cylinder at 60° C. an ethylene-butene-1 mixture (or an ethylene/propylene mixture, in the comparative examples) having the same composition of the copolymer to be obtained.

The feeding time depends on the reactivity of the catalytic system and on the copolymer amount required to provide the desired relative ratio between homopolymer and copolymer.

At the end of the copolymerization, the resulting powder was discharged, stabilized with Irganox B230, (0.06% by weight of the powder), a 5:1 blend of tetrakis methylene [3-(3′,5′-di-t-butyl-4′-hydroxyphenyl) propionate]methane and tris(2, 4-di-t-butylphenyl) phosphite, glyceryl monostearate (0.08% by wt. of the powder) and a synthetic talc (SHT) (0.12% by wt. of the powder), dried in an oven in a nitrogen stream at 60° C., and granulated.

The polymerizations carried out and the relevant operative conditions are recorded in Table I.

TABLE I

| EXAMPLE | Unit No. | 1 | 1C | 2 | 2C | 3 | 3C | 4 | 4C |
|---|---|---|---|---|---|---|---|---|---|
| 1st Step (HOMOPOLYMER) | | | | | | | | | |
| Temperature | °C. | 70 | 70 | 70 | 70 | 70 | 70 | 70 | 70 |
| Pressure | kg/cm²g | 30,2 | 30,3 | 30,2 | 30,2 | 30,2 | 30,4 | 30,4 | 30,3 |
| Time | minutes | 120 | 120. | 120 | 120 | 120 | 120 | 120 | 120 |
| Hydrogen | % moles | 0,34 | 0,6 | 0,36 | 0,4 | 0,4 | 0,8 | 0,8 | 0,6 |
| Catalyst | mg | 103 | 120 | 86 | 113 | 100 | 119 | 114 | 114 |
| Isotacticity Index | % | 95 | 97,2 | 97 | 97,8 | 96 | 98,2 | 98 | 97,2 |
| 2nd Step (BIPOLYMER) | | | | | | | | | |
| Temperature | °C. | 60 | 60 | 60 | 60 | 60 | 60 | 60 | 60 |
| Pressure | kg/cm²g | 6,5 | 7,6 | 7,4 | 7,6 | 7,7 | 8,4 | 7,6 | 10,1 |
| Time | minutes | 130 | 110 | 160 | 90 | 100 | 160 | 130 | 55 |
| Hydrogen | % moles | 0,3 | 0,1 | 0,3 | 0,2 | 0,5 | 0,2 | 0,2 | 0,1 |
| Fed ethylene | g | 50 | 66 | 67 | 66 | 91 | 100 | 126 | 168 |
| Fed propylene | g | — | 150 | — | 150 | — | 117 | — | 54 |
| Fed butene | g | 200 | — | 200 | + | 156 | — | 56 | — |
| Ethylene/propylene (fed monomers) | g/g | — | 57/43 | — | 57/43 | — | 75/25 | — | 88/12 |
| Ethylene/butene (fed monomers) | g/g | 51/49 | — | 54/46 | — | 70/30 | — | 88/12 | — |
| Ethylene (gas phase) | % mol | 30 | 38 | 34 | 43 | 45 | 59 | 78 | 81 |
| Total polymer | Kg | 4,2 | 5,63 | 3,64 | 4,7 | 3,6 | 4,3 | 4,26 | 3,2 |

The results obtained in the polymerization of Table I are presented in Table II in which Examples 1-4 represent embodiments of this invention, and Examples 1C-4C represent specific compositions of the prior art.

The resistance to whitening was determined by subjecting to the impact of a ram having a pre-established weight small discs prepared from the polymer being tested. Both the minimum height (h) necessary to obtain whitening, and the width (ϕ) of the whitened area at the maximum height allowed by the apparatus are recorded in Table II.

TABLE II

| EXAMPLE | Unit No. | 1 | 1C | 2 | 2C | 3 | 3C | 4 | 4C |
|---|---|---|---|---|---|---|---|---|---|
| Total ethylene | % b.w. | 11,1 | 11,3 | 13,5 | 13,4 | 15,9 | 17,8 | 19,1 | 19,3 |
| Total butene | % b.w. | 10,5 | — | 11,5 | — | 7,1 | — | 2,6 | — |
| Solubility in xylene | % b.w. | 15,6 | 16,9 | 16,4 | 15,5 | 12,4 | 12,3 | 3,9 | 4,2 |
| [η] Sol. in xylene | dl/g | 2,41 | 2,56 | 2,54 | 2,2 | 2,66 | 2,84 | 2,05 | 2,4 |
| Melt index L | g/10′ | 3,7 | 3,4 | 2,2 | 2,9 | 2,7 | 3,6 | 2,35 | 2,1 |

TABLE II-continued

| EXAMPLE | Unit No. | 1 | 1C | 2 | 2C | 3 | 3C | 4 | 4C |
|---|---|---|---|---|---|---|---|---|---|
| Flexural elastic modulus | MPa | 1080 | 1010 | 860 | 1070 | 1160 | 1020 | 1300 | 1280 |
| Trans. brittle/ductile | °C. | −44 | −48 | −49 | −52 | −55 | −46 | −47 | −48 |
| Resilience IZOD C.I. | J/m | 207 | 579 | 772 | 177 | 182 | 148 | 114 | 95 |
| HDT (46 N/cm$^2$) +23° C. | °C. | 70 | 68 | 70 | 75 | 78 | 76 | 81 | 76 |
| (Impact whitening) | | | | | | | | | |
| h | cm | 25 | 8,5 | 40 | 8,5 | 20 | 7,0 | 25 | 14 |
| φ cm | | 0,5 | 1,05 | 0,3 | 1,05 | 0,8 | 1,35 | 0,35 | 0,5 |

Table II demonstrates the improved whitening resistance obtained by the polypropylene compositions of this invention compared to the polypropylene compositions of the prior art. This is achieved without sacrificing rigidity and impact resistance.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

The expression "consisting essentially of" as used in this specification excludes any unrecited substance at a concentration sufficient to substantially adversely affect the essential properties and characteristics of the compositions of matter being defined while permitting the presence of one or more unrecited substances at concentrations insufficient to substantially adversely affect said essential properties and characteristics.

We claim:

1. A polypropylene composition having high impact resistance at low temperatures, and improved whitening resistance, consisting essentially of
   60–90 parts by weight of polypropylene, the isotacticity index of which is greater than 90, and
   10–40 parts by weight of an ethylene-butene-1 polymeric mixture containing 50–95% by weight of polymerized ethylene, and consisting essentially of
      20–95% weight of a crystalline fraction that has polyethylene-type crystallinity, and that is insoluble in xylene at room temperature, and
      5–80% of an amorphous fraction that is soluble in xylene at 23° C., and that contains 40–70% by weight of polymerized ethylene.
   and in which mixture the weight ratio of total polymerized ethylene to the amorphous fraction is 0.6–8, said composition being obtained by the sequential polymerization of propylene to polypropylene and subsequently copolymerizing ethylene and butene-1 in the presence of said polypropylene.

2. A polypropylene composition according to claim 1 in which the isotacticity index of said polypropylene is greater than 95.

3. A process for preparing a polypropylene composition having high impact resistance at low temperatures, and improved whitening resistance, comprising effecting sequentially
   the stereoregular homopolymerization of propylene to polypropylene, the isotacticity index of which is greater than 90, in an amount of 60–90 parts by weight of the final product, and in the presence of said polypropylene the copolymerization of ethylene and butene-1 to a polymeric mixture containing 50–95% by weight of polymerized ethylene and consisting of 20–95% by weight of a crystalline fraction that has polyethylene-type crystallinity and is insoluble in xylene at 23° C., and 5–80% by weight of an amorphous fraction that is soluble in xylene at 23° C. and contains 40–70% by weight of polymerized ethylene, and in which mixture the weight ratio of total polymerized ethylene to the amorphous fraction is 0.6–8.

4. A process according to claim 3 in which the polymerization is effected with a stereospecific coordination catalyst comprising a titanium compound carried on a magnesium halide in the active form having a surface area greater than 3 m$^2$/g or in the X-ray spectrum of the magnesium halide the line of higher intensity appearing in the spectrum of a non-activated magnesium halide is broadened or replaced by a halo.

5. A process according to claim 4 in which the stereoregular homopolymerization of propylene is carried out in liquid propylene, and the copolymerization of ethylene and butene-1 is carried out in the gas phase.

* * * * *